G. AJELLO.
SAFETY DEVICE FOR AIRCRAFT.
APPLICATION FILED FEB. 1, 1919. RENEWED MAR. 17, 1920.

1,354,367.

Patented Sept. 28, 1920.
4 SHEETS—SHEET 1.

WITNESSES:

INVENTOR.
Gaetan Ajello

G. AJELLO.
SAFETY DEVICE FOR AIRCRAFT.
APPLICATION FILED FEB. 1, 1919. RENEWED MAR. 17, 1920.
1,354,367. Patented Sept. 28, 1920.
4 SHEETS—SHEET 2.
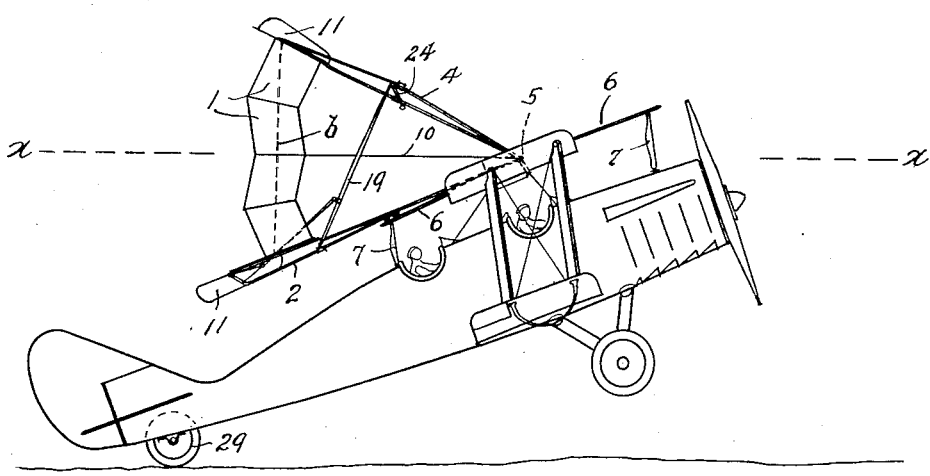
Fig. 4
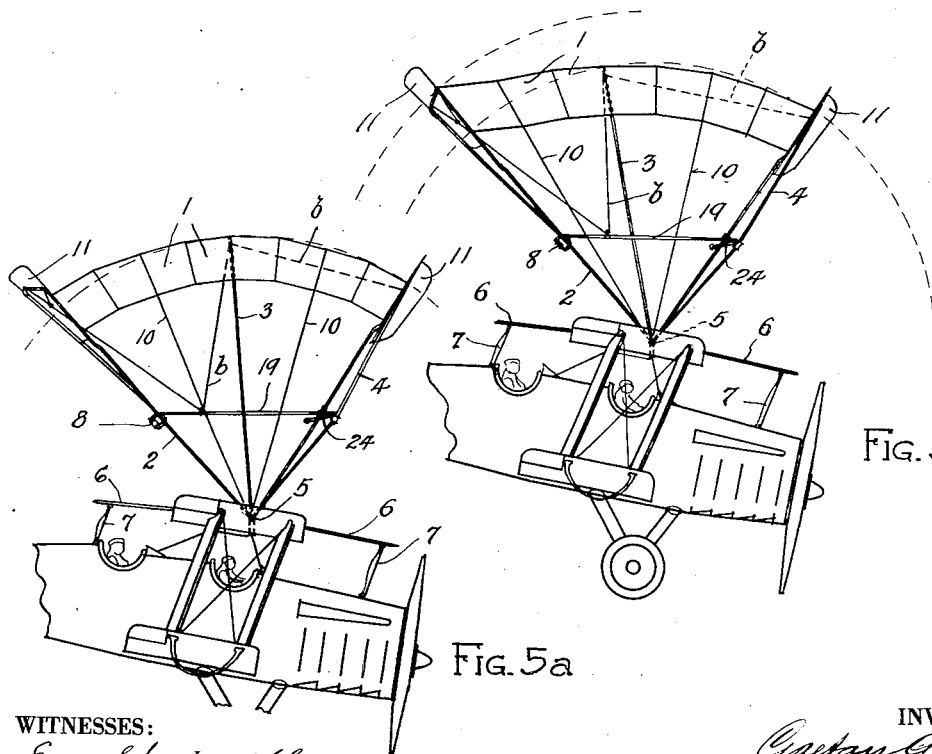
Fig. 5
Fig. 5a

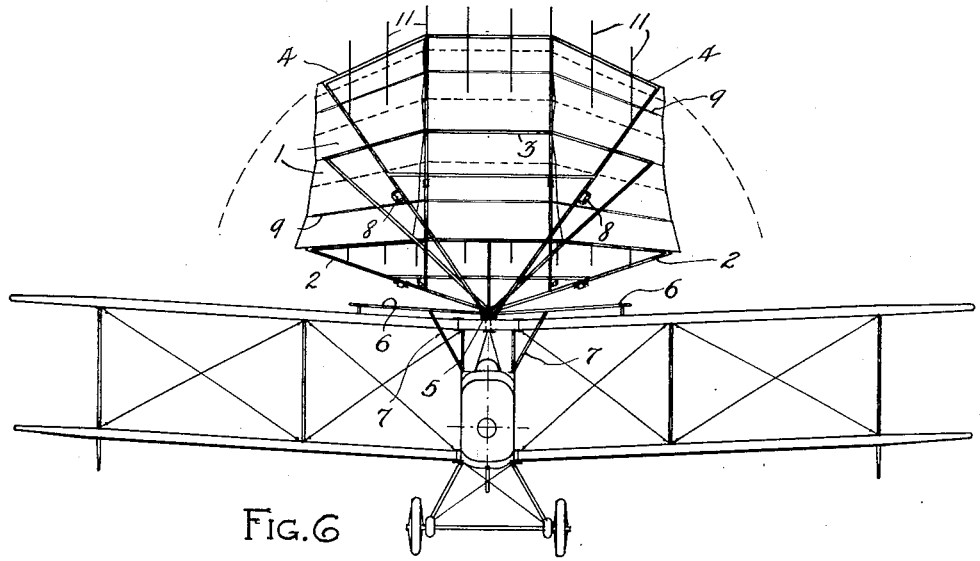
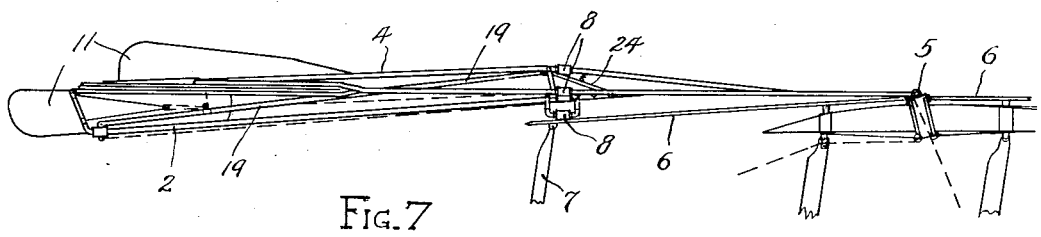
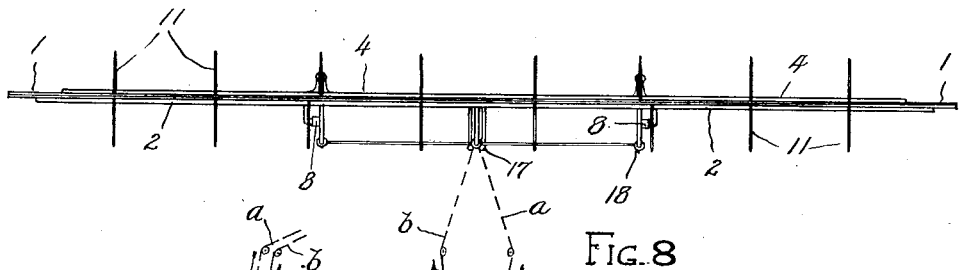
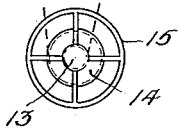

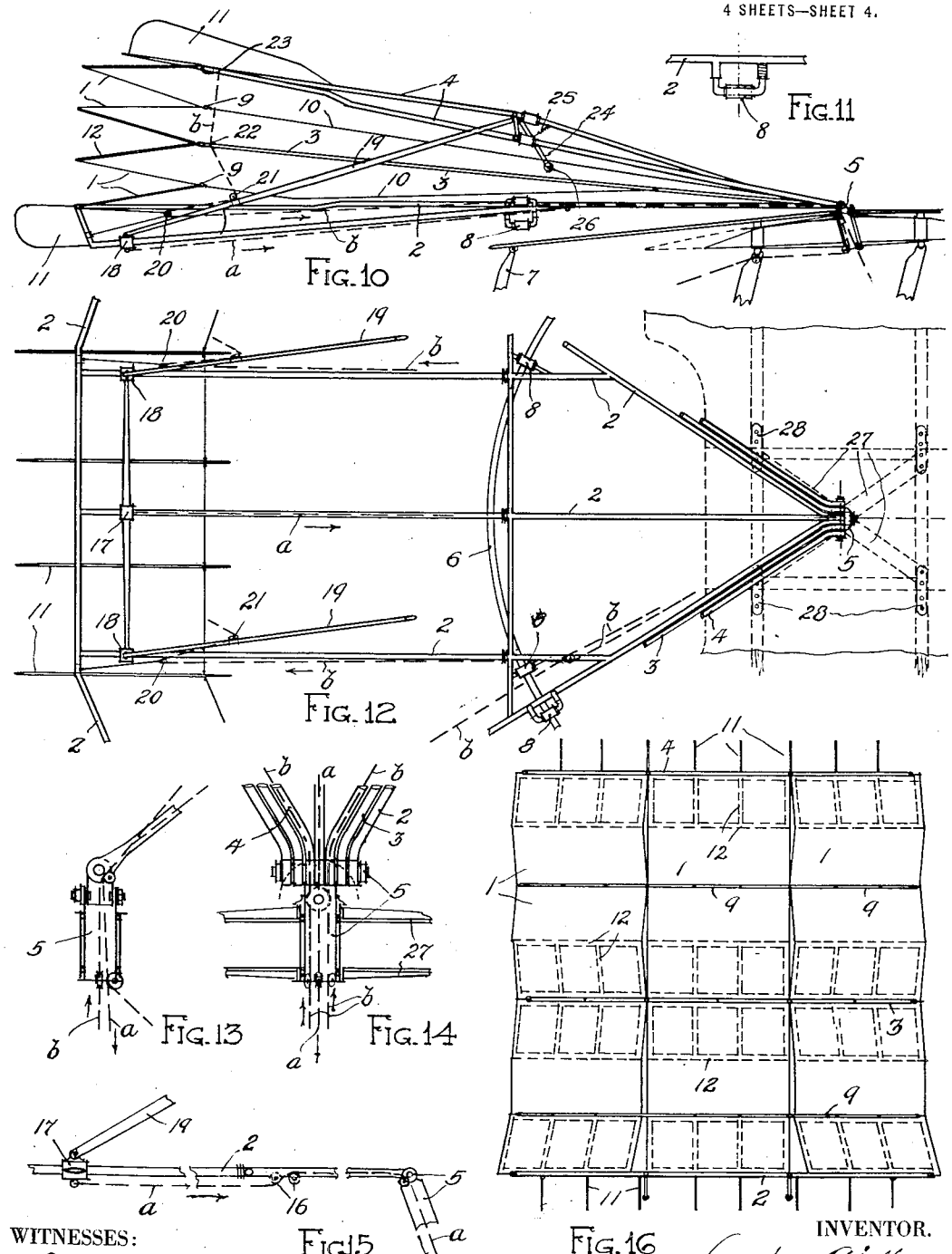

UNITED STATES PATENT OFFICE.

GAETAN AJELLO, OF NEW YORK, N. Y.

SAFETY DEVICE FOR AIRCRAFT.

1,354,367. Specification of Letters Patent. Patented Sept. 28, 1920.

Application filed February 1, 1919, Serial No. 274,444. Renewed March 17, 1920. Serial No. 366,675.

*To all whom it may concern:*

Be it known that I, GAETAN AJELLO, a citizen of the United States, and a resident of the city of New York, borough of Manhattan, in the county and State of New York, have invented a new and Improved Safety Device for Aircraft, of which the following is a full, clear, and exact description.

The objects of the invention are: first, to prevent the fatal fall of an aeroplane or other analogous aircraft due to any cause whatsoever, by the developing through a control of an emergency webbed surface or auxiliary wing, that automatically will take a flying position no matter what the direction of fall of the machine; secondly, to provide a brake for aircraft consisting of an adequate surface that the pilot at will may develop normally to the direction of flight so as to decrease almost instantly the speed of the machine whenever desired; thirdly, to avoid so many accidents to aeroplanes or similar aircraft, particularly nose dives, while landing, by a device acting automatically through a combination of forces to cause the aeroplane to raise its nose and lower its tail to the ground and stop within a brief time or short distance, or almost immediately; in other words to give to the aeroplane that property possessed by birds whereby they force their heads up while lowering their feet to the landing object, by opposing their wings and tail in the form of a cup against the direction of flight.

These and other objects are obtained through the partial or total development, by means of compensating controlling connections such as wires, or a surface, plane, or wing, in addition to the parts of an ordinary aircraft. The device is illustrated in the accompanying drawings in which—

Fig. 4 is a side elevation of my device in semi-open position acting on the aeroplane at the moment of landing by raising its nose and stopping its speed.

Fig. 5 is a side elevation of the device entirely opened, acting as an additional or emergency wing.

Figure 1:
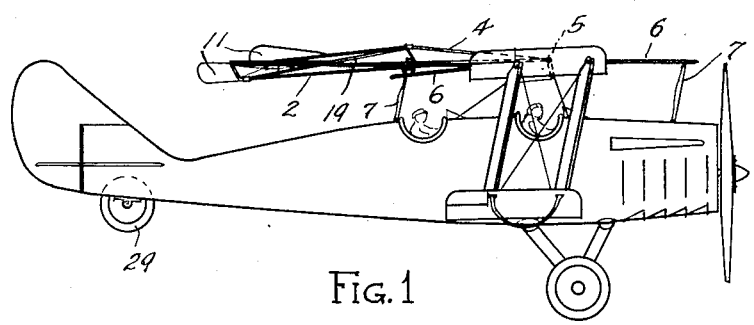
Figure 1 is a side elevation of an aeroplane with my device attached to it in closed or inoperative position.

Fig. 5ª is a view similar in its nature to Fig. 5, but showing a slight modification of design.

Fig. 6 is a front view of an aeroplane with my device entirely opened attached thereto.

Fig. 7 is an enlarged side elevation of the device in closed position.

Fig. 8 is an enlarged rear view of the device corresponding to Fig. 7.

Fig. 9 is a side view of the controlling apparatus showing the winding of the controlling wires to open and close the device.

Fig. 10 is an enlarged schematic side elevation of the device.

Fig. 11 is a half elevation and half section of a spring roller attached to the device.

Fig. 12 is an enlarged combination of a plan and perspective view of the main or lower frame of the device, illustrating also the method of attachment of the device to the aeroplane.

Fig. 13 is a side elevation of the universal joint attachment of my device to the aeroplane.

Fig. 14 is a front elevation showing also the general position and action of the controlling wires.

Fig. 15 is an enlarged elevation of a portion of the lower frame of the device, illustrating the typical method of the main or opening control; and Fig. 16 is a front elevation of the development of the entire emergency surface or wing.

Referring by numerals to the drawings, the emergency or auxiliary surface or wing 1 is made of aeroplane linen, wood veneer, or any other suitable flexible material in sheets divided in sections for easy assemblage or manipulation. Said surface or wing is developed or closed by mechanism consisting of three approximately triangular frames of which the lowermost is indicated at 2, the medium or central one at 3, and the uppermost frame at 4, all uniformly disposed to one another, that is to say each having two sides converging into the same point or vertex 5, (which is the point of attachment of the safety device to the aeroplane), and the third side, the one opposite to the vertex, is in the shape of a section of the perimeter of a polygon circumscribed by a circumference having as its center the same vertex 5. Each straight division of said polygonal side or portion of the several frames is to consist of or carry a separate panel, layer, or part of the aforesaid webbed or impervious surface 1. From what has just been stated it is to be understood that I do not wish to be limited to any particular number of sections into which the collapsible impervious surface may be formed. As will be noted in the comparison of Figs. 2 and 3, for example, the same general form and effect may be realized whether the collapsible surface with respect to each frame member be in three, five or any other number of panels or sections, it being borne in mind that one of the objects of such divisions is to permit the impervious surface 1 to readily turn and adjust itself in the process of opening or closing.

The lower frame 2 is longer and extends rearward beyond the other two frames so as to form a bed for the layers or panels of the surface 1 when this is closed, and also to give the shape of a wing to said surface 1 when fully opened or developed as shown in Fig. 5.

The three frames 2, 3, and 4, with the surface 1 connected thereto form together a unitary structure converging to the antifriction bearing universal joint 5 around which it can freely move through 360 degrees on a circular track 6 (having as its center the same joint 5) secured by any suitable means on the upper wing of the aeroplane and also the fuselage, or any other suitable rigid portions of the main portion of the machine, by means of supports 7. Contact of the frames in said track 6 is to be had by means of spring or resiliently supported rollers 8, see Fig. 11, which are also disposed laterally on the frames as the entire device is also capable to move vertically or sidewise (according to the direction of fall of the aeroplane) around the universal joint 5, shown best in Figs. 13 and 14.

Figure 2:
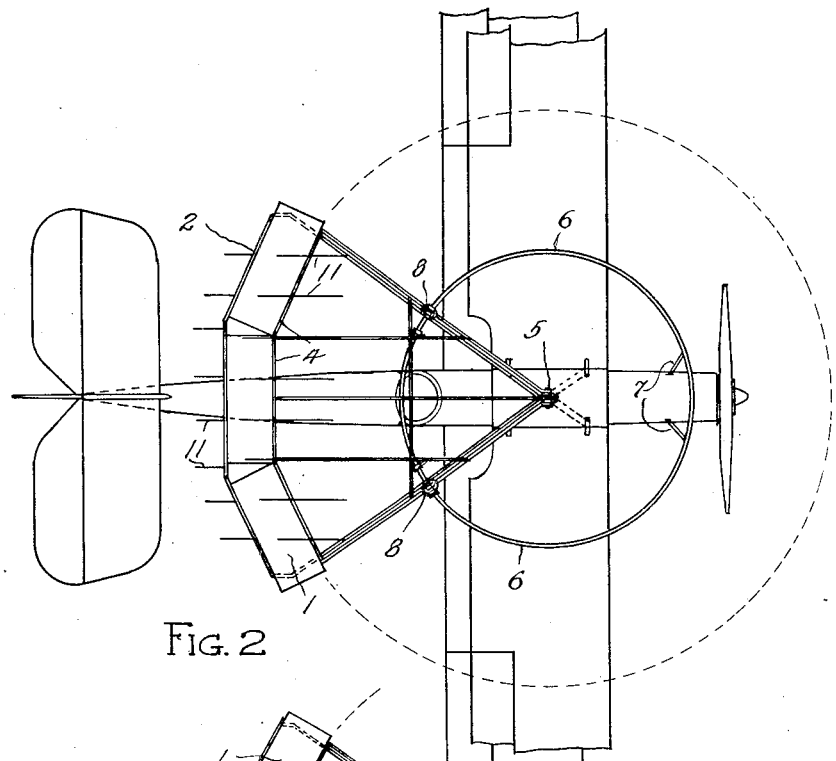
Fig. 2 is a plan view of the central portion of an aeroplane with my device attached to it, also in closed position.
Figure 3:
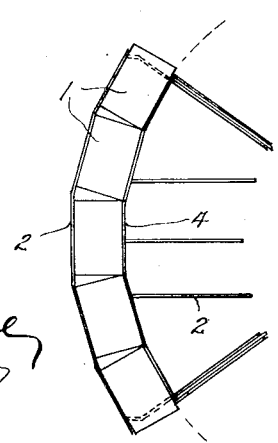
Fig. 3 is a plan view of a portion of the device showing a departure in form from Fig. 3.

In order to better distribute the working stresses of surface 1, and insure its easy closing, there are bars or hinge-like reinforcements 9 attached thereto intermediate the frames 2, 3, and 4, and connected through tension wires 10 toward the joint 5. Attached to the outer frames are fins 11 that compel the entire device to take always a position at back of any air pressure whether the device be open or closed and no matter of any position whatsoever of the aircraft. The upper edges of the fins 11 attached to the frame 2 and the lower edges of fins 11 attached to frame 4 serve to engage surface 1 when this is closed. It is obvious, as seen in Fig. 2, that the flow of air, during the flight, would practically suspend the device at leisure, by the folds of the impervious surface 1 acting as planes, so not to add any material weight to the machine.

The surface 1 as shown in its full development in Fig. 16 is divided into sections and reinforced at intervals by suitable ribs 12 indicated in dotted lines to adequately stiffen the portion of the surface 1 in which they are incorporated so as to facilitate the closing operation. See Fig. 10.

The safety apparatus is operated, that is opened or closed, by means of controlling wires or other suitable flexible connections of which the central one $a$ serves to open and the lateral ones $b$ to close; these wires necessarily move in opposite directions as shown in the lower portion of Fig. 8 and in Figs. 9, 13 and 14. They all pass through the tubular pivot member at the joint 5 and connect at one end with the hand operated controlling device shown in Figs. 8 and 9, and arranged in a way that while drum 13 winds up the connection $a$, by turning the controlling wheel 15, the drum 14 unwinds the wires $b$. These two drums may be related to each other in any suitable manner, but preferably they are fastened coaxially together and are movable simultaneously on the same axle. A movement in the reverse direction would wind up the wires $b$ and unwind the wire $a$, in this case closing the device. The central wire $a$ passing through pulleys 16 is attached to a ball bearing conveyer or slide 17 (see Figs. 12 and 15), which transmits the movement to two or more conveyers or slides 18 to which are pivoted two moving arms or struts 19 which connect to the upper or remote frame 4, to open or close the safety appliance. The wires $b$ through pulleys 20 attached to frame 2 pass through another pulley 21 attached to the arms 19 (so to assist the latter in the movement of closing) and after passing through another pulley 22 fastened to frame 3 terminate in the upper frame 4 at 23.

In order to initiate the opening movement of the arms 19 and thereby facilitate and expedite the development of the entire safety device, there is provided a smaller arm 24, see Fig. 10, connected through the same pivot as each arm 19 is connected to the upper frame 4 and hanging diagonally by means of a spring 25; it carries at its free end a roller 26 which is adapted, when the device is closed or lowered, to coöperate with or impinge against a member of the frame directly below in such a manner that the movement of a wire $b$ will push it to cause the initial raising of the upper frame, and consequently the initial sliding of the arms 19.

As shown in Figs. 10 and 12 the safety device through the universal joint 5 is attached to the strongest rigid portion of the aeroplane by means of straps 27, or their equivalent, fastened rigidly to the same connections 28 that secure the main wings to the machine. Such connection is vital to the attainment of the objects of the invention, especially the third object, if the aeroplane, by the action of the impervious surface 1 against the air pressure on the axis $x$—$x$ of Fig. 4, is forced by its force of inertia to rotate around the joint 5; therefore it raises its nose and lowers its tail to the ground. As a consequence of such movement and in order to fully attain the same object it is necessary to insert near the tail end of the aeroplane a wheel 29, representing any suitable anti-friction means, in place of the usual skid. It is also now obvious how the second object of the invention, namely to provide a brake for aircraft is attained by the surface 1 opposing itself against the air pressure. The attainment of the first object, namely the prevention of fatal fall of the machine, is also obvious as to the device (when closed) being always in the wake of any air pressure (by the action of its horizontal surface that serves as a plane to carry its weight, see Figs. 1 and 2, and by the action of its fins 11), as soon as the surface 1 is open it would oppose itself immediately normally to the air flow no matter what the direction of fall of the machine and immediately thereafter will dispose itself again in flying position. From the illustrations it will readily be seen that my device has nothing in common with parachutes or the like that have heretofore been proposed as safety means for aeroplanes or to enable the aviator to escape from a falling aeroplane. Rather my invention contemplates the provision of an auxiliary wing which is available not only for the control of the falling of the machine, but also as a retarding device or brake for the machine irrespective of the direction in which it may be moving through the air.

As is shown in Figs. 10 and 16 the above described impervious webbing comprises strips or sections hinged together along transverse axes at 9, and in this connection it is furthermore to be noted that the reinforcement means 12 which substantially embraces one half of each section of the webbing is arranged adjacent to said hinge lines at one end of each section. The arrangement is such that each section in the collapsing or folding of the webbing will be doubled along its transverse center and the reinforcement or stiffening member 12 in each section will insure proper folding action even though the other half of each section is formed without reinforcement or is left perfectly flexible.

The modified design of auxiliary plane or collapsible air resistance device, shown in Fig. 5ª, differs from Fig. 5 only in respect to the longitudinal form or curvature, whereas Fig. 5 shows a form more nearly simulating that of a standard aeroplane wing, in Fig. 5ª, I show a form in which there is a more decided cup-like pocket provided by the resistance member. In this form the frame members 2 and 4 may not differ so much in length as in the form of Fig. 5, but in all other essentials the parts are practically the same in both figures. By this modification I wish to establish the fact that the specific construction or design of the safety appliance is susceptible of a wider range of variation without departing from the spirit of the invention.

I claim:

1. In an aircraft, an air resistance member, a universal joint connection between the resistance member and the aircraft, a track fixed to the aircraft concentric with said joint, and supports between the resistance member and said track including a spring roller movable along the track.

2. In an aeroplane, the combination of a fuselage, a curved track connected to the fuselage, an air resistance member, universal joint connections between the resistance member and the fuselage, said joint being arranged in the center of curvature of said track, and anti-friction supports between the resistance member and the track whereby the resistance members may move freely around the universal joint connections and along said track.

3. In an aeroplane, the combination with rigid members thereof, of a rigid circular track connected to said rigid members, an air resistance member, universal joint connections between the resistance member and the axial center of said track, and movable supports between the resistance member and the track whereby some portion of said resistance member may be supported upon said track while the entire resistance member is movable around the universal joint connections.

4. In an aeroplane, the combination with fixed portions of the machine, of a circular track above the machine, connections between said track and the rigid portions of the machine maintaining the track in a fixed plane with respect to the fuselage, an air resistance member comprising a plurality of relatively movable frames and webbing between the frames, axial pivot connections between the resistance member and the rigid members aforesaid approximately at the center of the track providing for movement of the resistance member in directions parallel to the track and also toward the perpendicular to the plane of the track, and anti-friction means carried by the resistance member for supporting the same upon the track while moving in a plane parallel thereto.

5. The combination with an aeroplane, of a safety appliance therefor comprising a plurality of relatively movable frames, means pivotally connecting said frames together and to the aeroplane for swinging movement around a horizontal axis transverse to the line of flight, impervious webbing arranged between the frames, and means under the control of the operator to positively cause said frames to move apart to extend the webbing and to move toward each other to collapse the webbing.

6. The combination with an aeroplane, of a safety appliance therefor, said safety appliance comprising a plurality of approximately triangular frames, means to pivotally connect the apex portions of the frames to one another and to the aeroplane for universal movement with respect to the aeroplane, impervious webbing extending from one frame to the other along or adjacent to the sides thereof remote from the apexes, and means including flexible connections through which the operator in the fuselage may positively cause the safety appliance frames to swing away from and toward each other so as to extend or collapse said webbing.

7. The herein described safety appliance for aircraft, comprising a frame of substantially triangular outline and including also a pair of parallel longitudinal members, another frame movably connected to the first mentioned frame, impervious webbing extending from one frame to the other, and means under the control of the operator to cause said frame members to move relatively from each other to extend the webbing, said means including devices movable along said parallel members and coöperating with the second mentioned frame.

8. In a safety appliance for aircraft, the combination of a plurality of approximately triangular frames, means pivotally connecting the apex portions of the frames together for universal movement, one of said frames including a pair of parallel members, impervious webbing extending from one frame to another along portions remote from the pivotally connected portions, and means under the control of the operator to positively cause the swinging of the frame members away from one another, said last mentioned means including devices movable along said parallel members and a piar of arms extending from said members movable along the parallel members to the remote frame member.

9. In a safety appliance for aircraft, the combination of a series of frames, means movably connecting said frames to one another, one of said frames being longer than the others, impervious webbing extending from each of said frame members to all of the others along those portions thereof remote from the region of connection between the frames, said webbing being collapsible when the frames are moved into close parallel relation to one another, a series of parallel fins carried by the frames, the fins of the longest frame projecting beyond the webbing, and means to control the swinging movement of the several frame members toward and from one another.

10. In a safety appliance for aircraft, the combination with a rigid portion of the machine, of a safety air resistance device comprising frame members and webbing extending between the frame members, and universal joint connections between the safety device, frame members, and rigid portion of the machine providing for free movement of the safety device in any direction through arcs of circles on the upper side of the aircraft.

11. In a safety appliance for aircraft, the combination with a rigid portion of the machine, of a safety air resistance device comprising a plurality of frame members, universal joint connections between the frame members and the rigid portion of the machine including devices pivoting the frame members to one another for relative swinging movement around a transverse axis and means providing for rotation of the entire safety device around an axis perpendicular to said transverse axis, impervious webbing extending from one frame member to another remote from the transverse axis, and means under the control of the aviator to cause the movement of the frame members toward and from one another.

12. In a safety appliance for aircraft, the combination with a rigid portion of the machine, of a tubular pivot member having an approximately vertical axis, an air resistance device comprising a plurality of relatively movable frames and impervious webbing connecting them to one another, pivot connections between said frames and said tubular pivot member with the axis thereof perpendicular to the axis of the first mentioned pivot member, said resistance member being movable freely around the axis of the tubular member and the several frame portions thereof being movable freely around the transverse axis independently of the aforesaid movement, and means under the control of the operator movable through the tubular pivot member to control the relative movement of the frame members toward and from one another.

13. In a safety appliance for aircraft, the combination with the main part of the machine, of a safety appliance comprising relatively movable frame members and impervious webbing connecting them, universal joint connections between the safety appliance and main frame including a tubular member having a fixed axis with respect to the frame and other pivot connections between the movable frame members and the tubular member perpendicular thereto and means under the control of the aviator to cause relative movement of the frame members toward and from each other, said last mentioned means including a plurality of oppositely movable flexible connections coöperating with the frame members and movable through the tubular pivot member, a pair of drums upon which said flexible connections are reversely wound, and hand means to cause the actuation of said drums in either direction.

14. In a safety appliance for aircraft, the combination of a pair of frames movable relatively toward and from each other, webbing extending from one frame to the other and serving when the frames are separated to provide an auxiliary wing, means to support the frames, and means acting between the frames to control the movement thereof toward and from each other, said means including an arm pivotally connected to one of the frames and having a free end coöperating with the other frame when in collapsed position.

15. In a safety appliance for aircraft, the combination of a pair of frames movable relatively toward and from each other, means to support the frames, webbing extending from one frame to the other and constituting therewith an auxiliary plane when extended, and means acting between the frames to control the movement thereof toward or from each other, said last mentioned means including a strut pivoted to one of the frames and having slidable connection along the other frame and also including a spring operated arm pivoted to one of the frames and tending to extend it at an angle therefrom, but being adapted to coöperate with the other frame when the frames are collapsed for the purpose of initiating the opening movement.

16. In a safety appliance for aircraft, an impervious webbing comprising a plurality of sections jointed to one another for folding one upon another, said sections being formed of flexible material, and each section being provided with stiffening means along one portion thereof.

17. In a safety appliance for aircraft, an air resistance member comprising a plurality of flexibly connected sections or units of impervious material, each of said sections being foldable intermediate of its ends, a reinforcement or stiffening device carried by each of said sections or units between one end thereof and the folding line, and means under the control of the operator to cause the extension and folding of the air resistance member.

18. In a safety device for aircraft, the combination with a rigid portion of the machine, of a safety device comprising frame members, pivot connections between the frame members adapting them to be moved from approximately the same plane into planes at an angle to one another, means to control the movement of the frame members with respect to such angles, foldable webbing extending between the frame members remote from the axis through which they are connected to one another, and means supporting the safety device for movement around an axis and perpendicular to the axis through which the frame members are pivoted to one another.

19. In a safety appliance for aircraft, a plurality of rigid frame members pivotally attached to one another for movement into approximately the same plane and to planes at an angle to one another, impervious webbing extending from one frame member to another and comprising a plurality of sections jointed to one another intermediate of the frames, and means under the control of the operator to control the position of the frame members with respect to one another providing for the safety device to be carried either in idle flat position and elevated extended position for use as an auxiliary plane, or in an intermediate position for use as a brake or retarder.

20. In a safety appliance for aircraft, the combination of a plurality of frames movable relatively toward and from each other so as to lie in substantially the same plane or in spaced planes, means under the control of the operator to control the relative positions of the frames, impervious webbing extending between the frames and foldable intermediate thereof for close nesting purposes, universal joint connections between the frames and the machine, and auxiliary devices carried by the frames and trailing rearward for the purpose of causing the safety device to always carry in a trailing position with respect to the line of movement.

21. In an aeroplane, the combination with a body having a nose and a tail and a main air supporting means, of air engaging resistance means carried by the body above the center of gravity of the machine, means to bring said resistance means into action and so causing the nose to be lifted and the tail to be lowered while simultaneously the speed is reduced, and anti-friction means carried adjacent to the tail for coöperation with the ground when the tail is lowered.

22. In an aircraft, the combination of a body having a nose and a tail, and supporting means extending from the sides of the body, of resistance means, and means to bring the resistance means into action above the center of gravity of the machine to reduce the speed of the aircraft and cause simultaneously the lifting of the nose and the lowering of the tail.

GAETAN AJELLO.